April 16, 1946.  J. W. JOHNSTON  2,398,377
SELF-LOCKING BURR
Filed Sept. 16, 1944    2 Sheets-Sheet 1
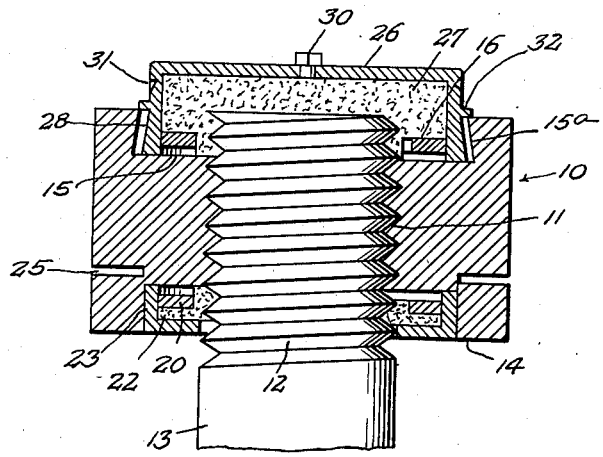
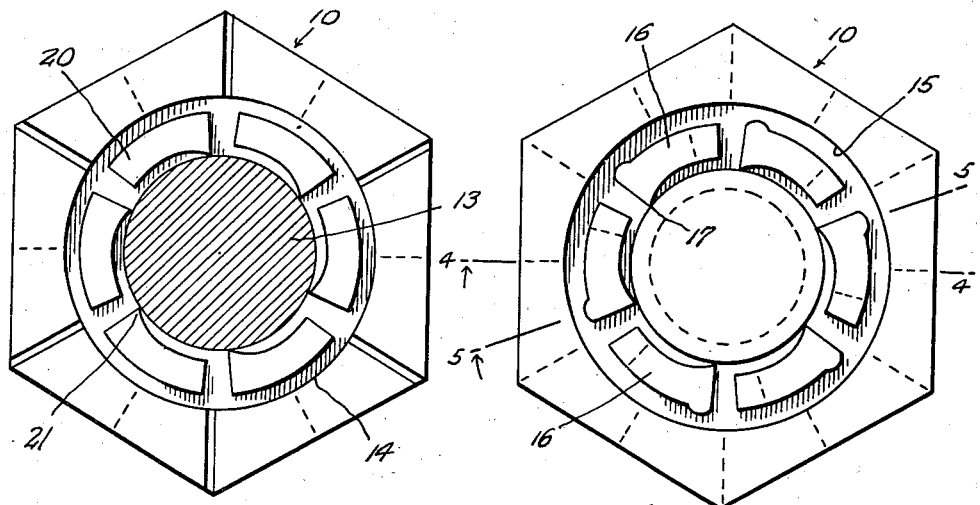
Inventor
Joseph W. Johnston.
By Clarence A. O'Brien
and Harvey B. Jacobson
Attorneys April 16, 1946.    J. W. JOHNSTON    2,398,377
SELF-LOCKING BURR
Filed Sept. 16, 1944    2 Sheets-Sheet 2

Inventor
Joseph W. Johnston,

By Clarence A. O'Brien
and Harvey B. Jacobson
Attorneys

Patented Apr. 16, 1946

2,398,377

UNITED STATES PATENT OFFICE 2,398,377

SELF-LOCKING BURR

Joseph W. Johnston, Moneta, Calif.

Application September 16, 1944, Serial No. 554,467

5 Claims. (Cl. 151—25)

This invention relates to self-locking burr or nut. The primary object of this invention is the provision of an improved self-locking burr which will remain in fixed position under difficult conditions of usage.

An additional object is the provision of such a burr which will resist any displacement due to vibration or the like.

Still another object is the provision of such a burr which will not be adapted to damage in any way the threads of a bolt or the like to which it may be applied, and which may be re-utilized several times if necessary or desirable.

Still another object is the provision of such a device adapted to be used with various types of metal without alteration or change.

A still further object is the provision of such a device provided with means for insuring against penetration of dirt to the screw threads or the like to which it is applied.

Still another object is the provision of such a burr which will be self-lubricating, containing sealed lubricant therein.

A still further object is the provision of a burr which will adapt itself to the use of a plurality of burrs on a single bolt, each being an individual unit and completely sealed.

Other objects will in part be obvious and in part be pointed out as the description of the invention proceeds.

Having reference now to the accompanying drawings wherein there are shown preferred embodiments of this inventive concept:

Figure 1 is a top plan view of the burr assembly, certain parts thereof being removed.

Figure 2 is a bottom view of the device.

Figure 4 is a sectional view taken substantially along the line 4—4 of Figure 1.

Similar reference characters refer to similar parts throughout the several views of the drawings.

Figure 3:
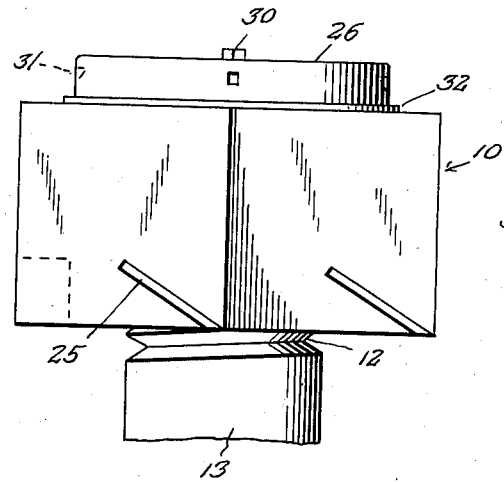
Figure 3 is a side elevational view of the complete assembly.

Having reference now to the drawings, there is generally indicated at 10 a self-locking burr or nut, comprised of an angular body in the illustrated form shown, hexagonal, and an interiorly threaded bore 11, adapted to engage the threaded portion 12 of a bolt or stud 13.

Cut into the base of nut body 10 is an annular recess 14 adjacent to the threads 12 of bolt 13. A similar annulus 15 is provided in a similar locality at the top of the body 10, but provided with obliquely inclined sides, as at 15a, for a purpose being more fully described hereinafter.

Figure 6:
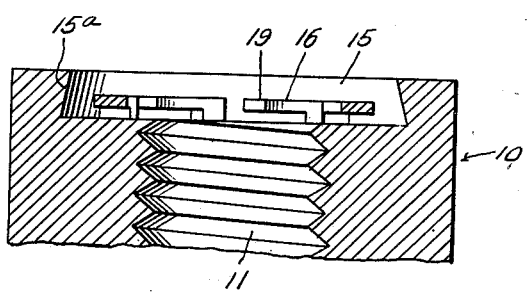
Figure 6 is a side sectional view showing certain of the operating parts of the mechanism, in the course of assembly.

Upper annulus 15 has a plurality of teeth 16 integrally formed therein, circumferentially spaced and partially raised from the bottom and provided with projecting points 17 adapted to engage the threads 12 of bolt 13 when the device is applied (see Fig. 1), and each of the teeth or spurs 16 being generally arcuate in configuration to conform to the curvature of their associated annulus as well as the curvature of the bolt 13; and each being undercut in a horizontal direction, only united to the bottom of the annular by heel 16a as best shown in Figures 1 and 6, to form extending free resilient portions 19.

Annulus 14 is provided with similar teeth 20 provided with spurs or points 21 similarly united with the bottom of the annulus. A packing gasket or ring 22 is positioned in annulus 14 adjacent teeth 20 and secured in position, as by a cup or housing ring 23, generally L-shaped in cross sectional configuration and adapted to engage closely within the space formed by the annulus.

Figure 5:
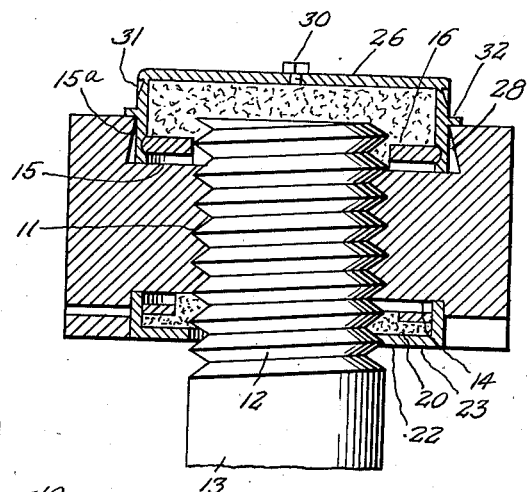
Figure 5 is a sectional view taken substantially on the line 5—5 of Figure 1.

As best shown in Figures 3 and 5 oblique castellations 25 cut through the base of body portion 10 into the annular recess 14 form locking points at their inner extremities to engage the cup 23 with the gasket or packing material 22 contained therein.

An upper cap 26 is adapted to contain packing material 27 and seat firmly over the teeth 16, being held in position by the engagement of a snap acting tapered portion 28 engaging with the oblique sides 15a of annulus 15. Cap 26 is provided with a filter gland 30 to preclude the formation of any vacuum caused by expansion and contraction of the component parts within the burr assembly. Indentations 31 are provided peripherally about the exterior of cap 26, as is a relief shoulder 32 to provide means for relatively ready removal of the same when desired.

Figure 7:
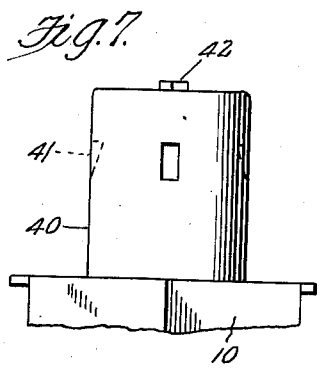
Figure 7 is a side elevational view of a modified detail of construction.

The device hitherto described is adapted to fit closely over the extremity of an extending bolt or shank, but in some instances such fit may be precluded and of necessity the extremity of the bolt or shank extends well beyond the normal locking burr. A modification to accommodate such conditions is shown in Figure 7, wherein a locking burr 10 is shown, identical in all respects with that previously described, with the exception of the cap. The cap portion 40 is generally similar in configuration with cap 26, being provided with recesses 41, and a filter 42, but is provided with side walls adapted to accommodate either a relatively long extending bolt or shank, or an increased quantity of packing or gasket material, and/or lubricant.

From the foregoing it will be seen that there is herein provided an improved locking burr accomplishing all of the objects of this invention and others including many advantages of great practical utility and commercial importance.

As many embodiments may be made of the inventive concept, and as many modifications may be made in the embodiment hereinbefore shown and described, it is to be understood that all matter herein is to be interpreted merely as illustrative and not in a limiting sense.

I claim:

1. In a device of the character described, in combination, a body portion having upper and lower annular recesses formed therein, teeth integrally formed in the bottom of said recesses and raised thereabove, said teeth comprising circumferentially spaced and vertically supported arcuate members provided at their extremities with points, packing material engaged by said teeth, and means for holding said packing in position.

2. In a device of the character described, in combination, a body portion having upper and lower annular recesses formed therein, teeth integrally formed in the bottom of said recesses and raised thereabove, said teeth comprising circumferentially spaced and vertically supported arcuate members provided at their extremities with points, packing material engaged by said teeth, and means for holding said packing in position, said means including a locking ring in said lower recess and a packing and lubricant-containing cup in said upper recess with interengaging tapering surfaces for retaining said cup in the upper recess.

3. In a device of the character described, in combination, a body portion having upper and lower annular recesses formed therein, teeth integrally formed in the bottom of said recesses and raised thereabove, said teeth comprising circumferentially spaced and vertically supported arcuate members provided at their extremities with points, packing material engaged by said teeth, and means for holding said packing in position, said means including a locking ring in said lower recess and a packing and lubricant-containing cup in said upper recess with interengaging tapering surfaces for retaining said cup in the upper recess, and a filter gland on said cup.

4. In a device of the character described, in combination, a body portion having upper and lower annular recesses formed therein, teeth integrally formed in the bottom of said recesses and raised thereabove, said teeth comprising circumferentially spaced and vertically supported arcuate members provided at their extremities with points, packing material engaged by said teeth, and means for holding said packing in position, said means including a locking ring in said lower recess and a packing and lubricant-containing cup in said upper recess, and a filter gland on said cup, and snap acting means engageable in said upper recess with interengaging tapering surfaces for holding said cup in position.

5. In a device of the character described, in combination, a body portion having upper and lower annular recesses formed therein, teeth formed in the bottom of said recesses, said teeth comprising circumferentially spaced and vertically supported arcuate members provided at their extremities with points, packing material engaged by said teeth, and means for holding said packing in position, and means forming oblique castellations cut through said body portion into one of said recesses, their extremities forming points.

JOSEPH W. JOHNSTON.